United States Patent
Pinera et al.

(10) Patent No.: US 10,054,005 B1
(45) Date of Patent: *Aug. 21, 2018

(54) TURBOCHARGER WITH OIL-FREE HYDROSTATIC BEARING

(71) Applicants: Alex Pinera, Jupiter, FL (US); Timothy J Miller, Jupiter, FL (US)

(72) Inventors: Alex Pinera, Jupiter, FL (US); Timothy J Miller, Jupiter, FL (US)

(73) Assignee: FLORIDA TURBINE TECHNOLOGIES, INC, Jupiter, FL (US)

(*) Notice: Subject to any disclaimer, the term of this patent is extended or adjusted under 35 U.S.C. 154(b) by 577 days.

This patent is subject to a terminal disclaimer.

(21) Appl. No.: 14/607,846

(22) Filed: Jan. 28, 2015

Related U.S. Application Data (63) Continuation-in-part of application No. 14/245,199, filed on Apr. 4, 2014, now Pat. No. 9,540,952.

(60) Provisional application No. 61/881,667, filed on Sep. 24, 2013.

(51) Int. Cl.
*F01D 25/22* (2006.01)
*F02B 37/04* (2006.01)

(52) U.S. Cl.
CPC ............. *F01D 25/22* (2013.01); *F02B 37/04* (2013.01)

(58) Field of Classification Search
CPC ............. F16C 2360/24; F16C 32/0662; F16C 32/0681; F16C 32/0603; F16C 32/0696; F02B 37/04; F02B 67/10; F01D 5/284; F01D 5/25; F01D 5/125; F01D 5/16; F01D 5/162; F01D 5/164; F01D 5/166; F01D 5/168; F01D 25/22; F05D 2220/40; F05D 2240/53; F04D 25/04; F04D 25/045; F04D 9/065; F04D 13/04; F04D 17/18; F04D 29/66; F04D 29/40; F02C 6/12; F05B 2220/40; F16J 15/126; Y02T 10/144

See application file for complete search history.

(56) References Cited

U.S. PATENT DOCUMENTS

| | | | |
|---|---|---|---|
| 5,253,985 A * | 10/1993 | Ruetz | F01D 25/164 384/473 |
| 6,327,857 B1 * | 12/2001 | Fredriksson | F01D 25/166 60/605.1 |
| 7,966,817 B2 * | 6/2011 | Schenck | F02B 41/10 184/6.12 |

(Continued)

FOREIGN PATENT DOCUMENTS

| | | | | |
|---|---|---|---|---|
| JP | WO 2012002161 A1 * | 1/2012 | | F01D 11/04 |
| WO | WO 0204827 A1 * | 1/2002 | | F16C 32/0696 |

OTHER PUBLICATIONS

Rimpel, A., & Kim, D. (2009). Rotordynamic performance of flexure pivot tilting pad gas bearings with vibration damper. Journal of Tribology, 131(2), 1-12. DOI: 10.1115/1.3063809.*

*Primary Examiner* — Charles Freay
(74) *Attorney, Agent, or Firm* — John Ryznic (57) ABSTRACT

A turbocharger for an internal combustion engine, the turbocharger being supported by hydrostatic bearings in both a radial and an axial direction by a compressed air supplied from a compressor of the turbocharger and boosted in pressure by a separate boost pump to a high enough pressure to support the rotor of the turbocharger. The turbocharger hydrostatic bearings are damped using wire mesh or dispersed friction dampers.

13 Claims, 6 Drawing Sheets

(56) References Cited

U.S. PATENT DOCUMENTS

| | | | | |
|---|---|---|---|---|
| 7,997,857 | B2* | 8/2011 | Battig | F01D 25/04 |
| | | | | 415/119 |
| 8,182,206 | B2* | 5/2012 | Cavagnaro | F02B 37/013 |
| | | | | 415/119 |
| 8,534,066 | B2* | 9/2013 | Cavallo | F01D 17/105 |
| | | | | 123/562 |
| 8,544,267 | B2* | 10/2013 | Danielewicz | F01N 13/10 |
| | | | | 277/592 |
| 9,109,800 | B2* | 8/2015 | Auzelyte | F23J 13/04 |
| 2008/0038109 | A1* | 2/2008 | Sandstede | F01D 25/22 |
| | | | | 415/111 |
| 2009/0252599 | A1* | 10/2009 | Cavagnaro | F02B 37/013 |
| | | | | 415/119 |
| 2010/0319343 | A1* | 12/2010 | Arnold | F01D 5/048 |
| | | | | 60/605.1 |
| 2011/0033142 | A1* | 2/2011 | Kim | F16C 17/024 |
| | | | | 384/106 |

* cited by examiner

TURBOCHARGER WITH OIL-FREE HYDROSTATIC BEARING

CROSS-REFERENCE TO RELATED APPLICATIONS

This application is a CONTINUATION-IN-PART of U.S. patent application Ser. No. 14/245,199 filed on Apr. 4, 2014 and entitled TURBOCHARGER WITH OIL-FREE HYDROSTATIC BEARING; which claims the benefit to a Provisional Application 61/881,667 filed on Sep. 24, 2013 and entitled TURBOCHARGER WITH OIL-FREE HYDROSTATIC BEARING.

GOVERNMENT LICENSE RIGHTS

This invention was made with Government support under contract number FA8650-14-M-2470 awarded by the US Air Force. The Government has certain rights in the invention.

BACKGROUND OF THE INVENTION

Field of the Invention

The present invention relates generally to a turbocharger, and more specifically to a turbocharger with an oil-free hydrostatic bearing with mechanical dampers.

Description of the Related Art Including Information Disclosed Under 37 CFR 1.97 and 1.98

A turbocharger is used to compress air supplied to an engine using a hot gas exhaust as a driving force. The engine exhaust drives a turbine that drives a compressor to supply the compressed air to the engine. The performance of the engine is increased due to the compressed air.

Prior art turbochargers require shaft support systems that use oil lubricated bearings which depend on the viscosity of the fluid to provide a hydrodynamic film in the bearing. Components on the shaft typically include a compressor rotor mounted to one end of the shaft and a turbine rotor mounted to the other end of the shaft.

During operation of the turbocharger, significant radial and axial forces are produced by the compressor and the turbine which are reacted into the housing through the radial journal and axial thrust bearings. This is typically accomplished with a pressurized oil lubrication system to both remove heat and reduce rolling resistance. For a turbocharger, the lubrication system requires an oil cooler and a pump to supply sufficient pressure to the bearings while preventing the oil from coking. If oil pressure is lost or if the oil becomes contaminated from the internal combustion (IC) engine, degradation in bearing performance due to loss of lubrication or cooling occurs, leading to catastrophic failure of the turbocharger bearing system. Some advanced high temperature turbochargers utilize an additional coolant system in the bearing housing to further reduce bearing and bearing fluid temperature in order to prevent coking of the oil. A separate bearing lubrication system also adds weight to an aircraft which is critical to such aircraft as an unmanned aero vehicle or UAV.

BRIEF SUMMARY OF THE INVENTION

A turbocharger to supply compressed air to an internal combustion engine, the turbocharger includes a compressor driven by a turbine and a rotor supported by hydrostatic bearings in a radial and an axial direction. Compressed air from the compressor is directed into a boost pump that increases the pressure for use in the hydrostatic bearings. The boost pump can be driven by a power takeoff from the IC engine or from a separate motor such as an electric motor.

The hydrostatic bearings are oil-free and without any other fluid but the compressed air from the compressor and boost pump in order to allow for higher temperature exposure and to limit overall weight of the turbocharger for use in light weight aircraft such as an unmanned aero vehicle (UAV) where weight is critical to performance.

The hydrostatic bearings include journal bearings in the center of the turbopump with overhung compressor and turbine. Mechanical or friction dampers are used for the journal bearings to provide dampening of vibrations. Mechanical dampers can be full hoop dampers or segments spaced circumferentially around the bearing. A dispersed friction damper with an arrangement of small spherical members in a full hoop can also be used.

DETAILED DESCRIPTION OF THE INVENTION

The present invention is a turbocharger with an oil-free hydrostatic bearing and mechanical or dispersed friction dampers. The compressor discharge gas is used as the working fluid for the hydrostatic bearing with a boost compressor to achieve sufficient hydrostatic load capacity and damping in the bearings. The present invention improves reliability and durability by eliminating the temperature sensitive oil lubricant, the oil cooler, the oil pump and bearing housing cooling systems of the prior art turbochargers. This is accomplished by utilizing compressed gas (air) from the compressor to support the shaft hydrostatically. To reduce overall power consumption in the system, the bearing feed system is pre-boosted by the turbocharger compressor and then boosted to the required operating pressure using an oil-free positive displacement compressor that is either driven directly off of the engine through an accessory take-off or driven by a small electric motor. In either case, the total power draw is relatively small resulting in minimal impact to the IC engine performance.

Figure 1:
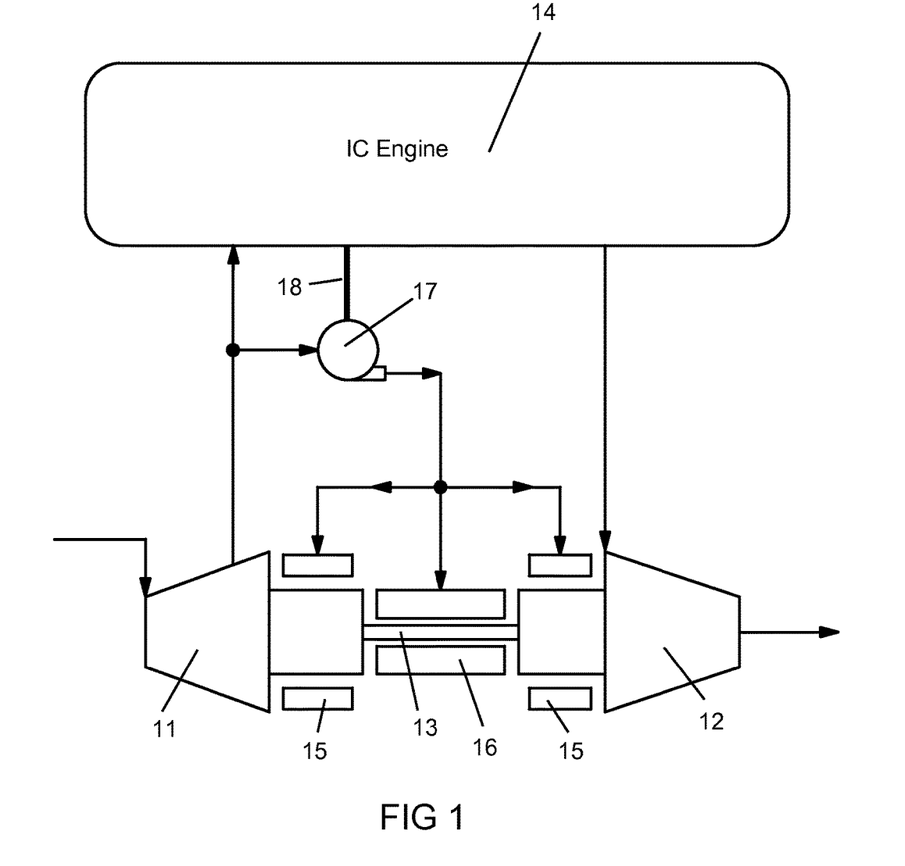
FIG. 1 shows a schematic view of the turbocharger with oil-free hydrostatic bearings of the present invention.

FIG. 1 shows a diagram view of the turbocharger with the oil-free hydrostatic bearings. The turbocharger includes a compressor 11 and a turbine 12 connected to a common rotor 13. Radial hydrostatic bearings 15 and axial hydrostatic (or thrust) bearing 16 support the rotor 13 in both the radial and axial directions.

Hot exhaust gas from an internal combustion (IC) engine 14 is supplied to the turbine 12 that drives the compressor 11 through the rotor 13 to compress air. The compressed air is then delivered to the engine 14. Some of the compressed air from the compressor 11 is bled off and supplied to a boost compressor 17 that increases the pressure to an amount sufficient to support the rotor 13 hydrostatically.

The boost compressor 17 can be driven directly by the engine 14 through an accessory take-off 18, a compression cylinder in the engine, or driven by a separate motor such as an electric motor.

Hydrostatic fluid film bearings provide a number of advantages that make them especially useful in high speed turbocharger shaft/rotor support systems. These include the following. An ability to support large loads. Hydrostatic bearing load capacity is a function of the pressure drop across the bearing land in which the fluid pressure is acting. Provides a long life (infinite in theory) because the surfaces do not touch. The stiffness and damping coefficients are very large which provides for exact positioning and control.

Using compressed air instead of oil as the working fluid in hydrostatic bearings for a turbocharger application provides for the following advantages. It eliminates lubricant failure modes, allowing for higher turbine inlet temperature operation. It reduces the thermal stresses in the bearing housing as a result of eliminating cooling passages required to prevent the oil from overheating. With increased operating temperatures in lean burning internal combustion engines, higher temperature bearings are required to support the rotor of a turbocharger. A small aircraft such as a UAV requires bearings that can withstand higher loads from maneuvers including sustained high G turns and operations in turbulent air. Hydrostatic bearings do not require the use of advanced coatings because internal parts do not rub after bearing lift-off occurs and as a result, high temperature materials including ceramics can even be used as bearing materials. A key benefit of the hydrostatic bearing in high altitude turbocharger applications is the ability to utilize the boost pressure provided by the turbocharger compressor to pre-boost the inlet pressure of a small oil-free compressor to maximize load capacity for all turbocharger operating conditions. The bearings can be lifted off prior to or immediately upon ignition of the IC engine to enable wear-free operation over the entire operating range.

Another significant benefit provided by hydrostatic bearings is the precision tolerance control they can provide. This is especially important for maximizing efficiency in turbochargers where the small diameter unshrouded compressors and turbines require minimal clearances (both radial and axial) to reduce leakage. This precision control of the shaft with a high degree of stiffness and damping makes the hydrostatic bearing well suited for the unmanned aerial system turbocharger application.

Figure 2:
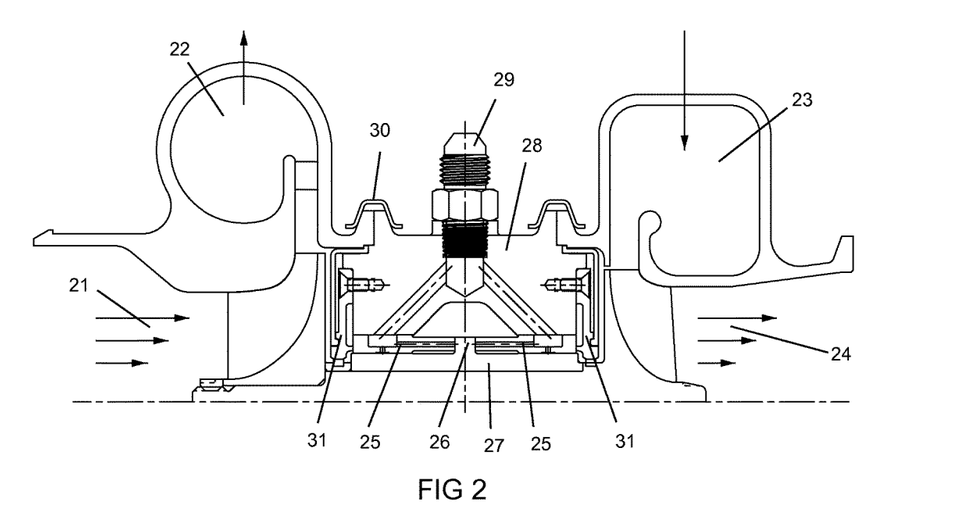
FIG. 2 shows a cross section view of a turbocharger with oil-free hydrostatic bearings of the present invention.

FIG. 2 shows a cross section view of a turbocharger with the oil-free hydrostatic bearings of the FIG. 1 diagram view. The turbocharger includes a compressor inlet 21 and a compressor outlet 22, a turbine inlet 23 and a turbine outlet 24, a journal bearing 25, a thrust bearing 26, a rotating journal 27, a bearing housing 28, a bearing air supply fitting 29, a V-band 30, and a seal land 31. The turbocharger has overhung compressor and turbine elements with bearings in the center housing, and seals which seal off the bearing compartment. A thrust bearing 26 is located in the center of the shaft to provide for symmetrical vents for each of the hydrostatic journal bearings 25. The turbo design of FIG. 2 provides for a simplification of the bearing compartment components. The bearing design is entirely symmetrical about the central plane of the thrust bearing 26 and thus provides for part duplication, which lends itself to being an after-market upgrade to an existing production turbocharger without hydrostatic bearings. One could replace the bearing housing of a prior art turbocharger with the hydrostatic air bearing in FIG. 2.

Figure 3:
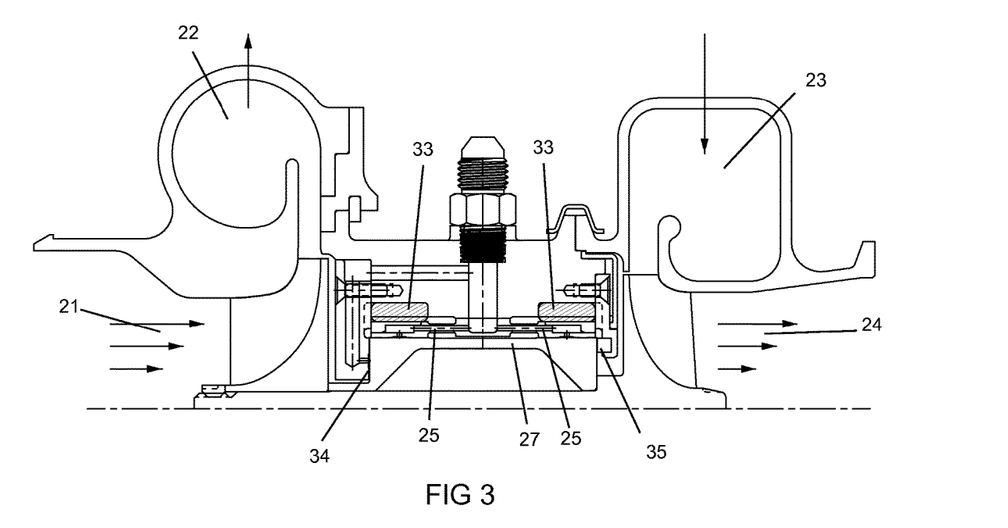
FIG. 3 shows a cross section view of a turbocharger with oil-free bearings and mechanical dampers with hydrostatic thrust bearing of the present invention.

FIG. 3 shows a turbocharger with mechanical dampers 33 positioned between the bearing housing 28 and the hydrostatic journal bearings 25. The mechanical friction dampers are of the wire mesh type. A hydrostatic thrust bearing 34 is located on the left side, and an axial rub stop 35 is located on the right side.

Figure 4:
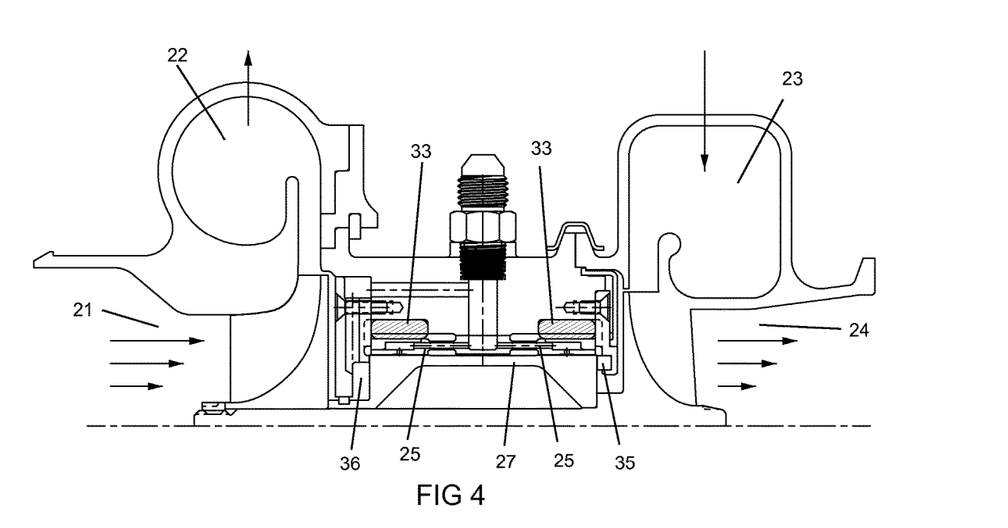
FIG. 4 shows a cross section view of a turbocharger with oil-free bearings and mechanical dampers with a balance piston of the present invention.

FIG. 4 shows a turbocharger similar to that in FIG. 3 but with a balance piston cavity 36 on the left side. Mechanical frictions dampers 33 are used on the same locations as in FIG. 3.

Figure 5:
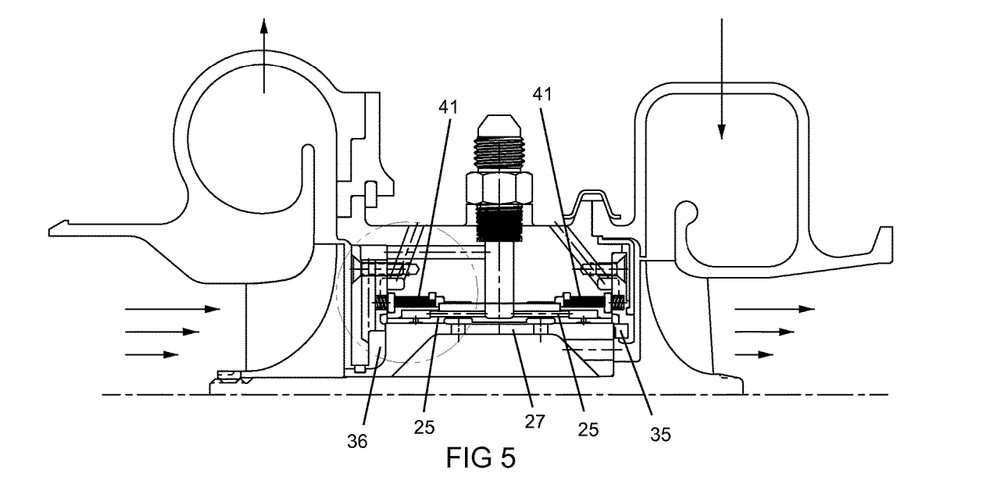
FIG. 5 shows a cross section view of a turbocharger with oil-free bearings and dispersed friction dampers of the present invention.
Figure 6:
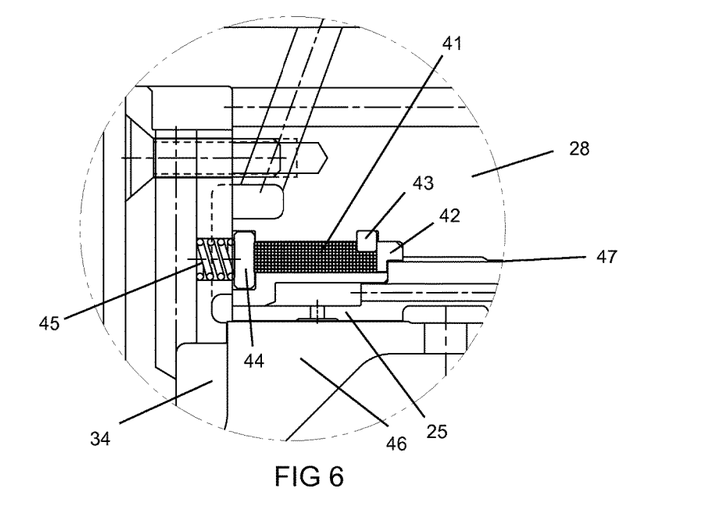
FIG. 6 shows a cross section close-up view of the dispersed friction damper in the FIG. 5 turbocharger.

The FIG. 5 embodiment of the turbocharger makes use of dispersed friction dampers in a full hoop arrangement. These friction dampers are small spherical elements made from a ceramic or a metallic material that produce damping by rubbing against one another within a confined space. FIG. 6 shows a detailed view of one of the dispersed friction dampers 41 with a seal 42, a snap ring member 43, a seal or cover plate 44, and a spring 45 to compress the friction damper balls within the confined space. A clearance 47 is formed between the bearing housing 28 and the floating journal bearing 25. The journal 46 is floating within the housing 28. The dispersed friction dampers 41 are formed of small spherical members that occupy the full hoop space between the bearing and the housing while the bearing journal is floating (bearing is supported to ground through the dampers). These spherical members can be metallic or ceramic and function as dampers by rubbing together to produce a dampening effect. The dispersed friction dampers behave like an incompressible fluid and mimic an oil squeeze film damper.

Figure 7:
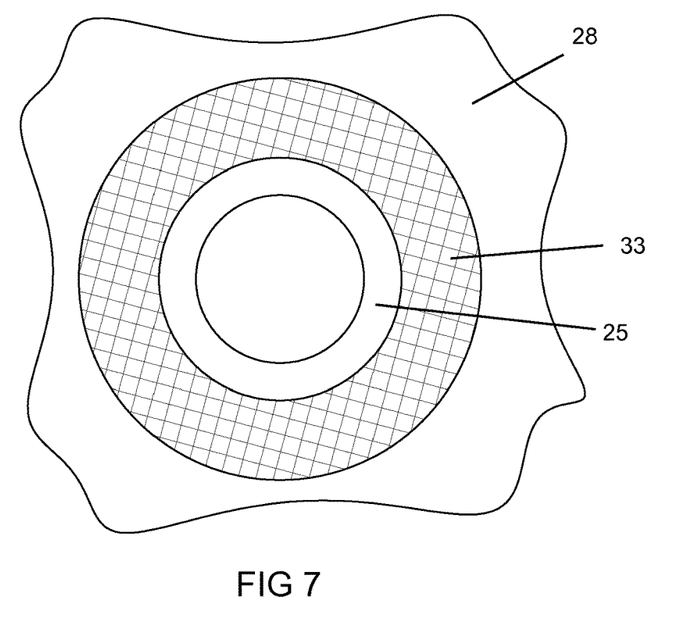
FIG. 7 shows a cross section side view of one of the friction dampers having a full annular shape.
Figure 8:
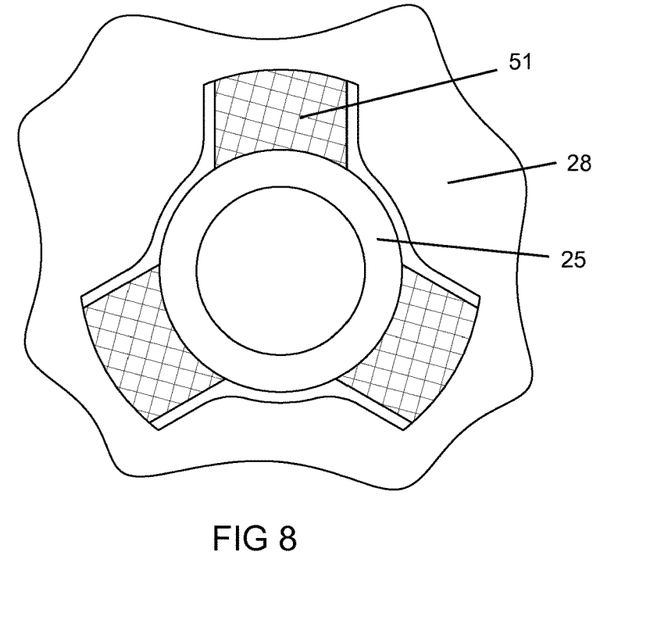
FIG. 8 shows a second embodiment of the friction damper in which three arc sections are arranged around the housing.

The two friction dampers 33 used in the FIGS. 3 and 4 embodiments are each a full 360 degree annular friction damper formed from a fine wire knitted mesh material like the shock & vibration isolators produced by Metex Corporation (www.metexcorp.com). FIG. 7 shows a side view of the full annular friction damper 33 secured between the bearing housing on an outer surface and the journal bearing 25 on the inner surface. The friction damper 33 is doughnut shaped. FIG. 8 shows a second embodiment of the friction damper in which three arched sections 51 are used that are equally spaced around the journal bearing 25.

Figure 9:
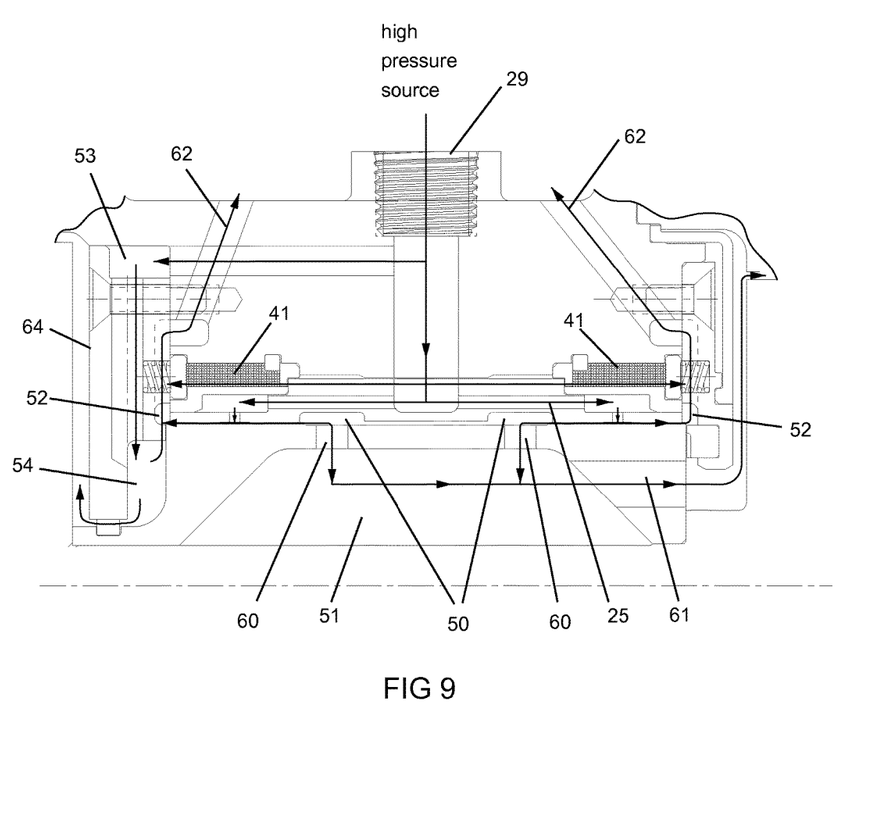
FIG. 9 shows a flow diagram of the flow entering and leaving the hydrostatic bearings and the balance piston.

FIG. 9 shows a flow schematic of the air supply and vent system. The high pressure flow enters through a center orifice through fitting 29. It then flows into a center cavity within the bearing journal 25 and the gap 47. A small percentage of flow goes through gap 47 to provide coolant, if needed, to the dampers 41 or 33. The majority of the flow then splits in the bearing journal 25; one half of the flow passes to the compressor side bearing and the other to the turbine side bearing. After providing the lift force in the hydrostatic bearing, the flow leaves the center portion of the hydrostatic bearings into a lower pressure cavity 50 formed between the runner 27 and the bearing journal 25 where it then enters cavity 51 between the runner 27 and the shaft 13 through a series of orifices 60 in runner 27. After entering cavity 51 the flow leaves through a series of orifices 61 in runner 27 and escapes into the turbine flow path where it is finally exhausted 24. This air provides cooling to the backside of the turbine rotor 12. The other half of the bearing flow leaves through cavity 52 and is exhausted to ambient pressure through control orifices 62.

The unidirectional thrust bearing 34 or thrust piston 36 flow splits off from the center pressure fitting 29 through orifices 63 and enters cavity 53. Cavity 53 feeds the thrust bearing or thrust piston through orifices 64 and into thrust cavity 54. A small portion leaks from cavity 54 into the compressor. The majority leaks into cavity 52 and vents through orifices 62.

We claim:

1. A turbocharger for an internal combustion engine comprising:
    a compressor to compress air for burning in the internal combustion engine;
    a turbine to drive the compressor using hot gas exhaust from the internal combustion engine;
    a rotor connected between the compressor and the turbine of the turbocharger;
    first and second hydrostatic bearings to rotatably support the rotor in a radial direction;
    a vibration damper positioned between a bearing housing and the hydrostatic journal bearing;
    a boost pump having an inlet connected to the compressor and an outlet connected to the first and second hydrostatic bearings to support the rotor; and,
    the boost pump increasing a pressure of the compressed air from the compressor to a higher pressure capable of supporting the rotor.

2. The turbocharger of claim 1, and further comprising: the rotor includes a hydrostatic axial thrust bearing supplied with compressed air from the boost pump.

3. The turbocharger of claim 1, and further comprising: the boost pump is driven by a power takeoff from the internal combustion engine.

4. The turbocharger of claim 1, and further comprising: the boost pump is driven by an electric motor.

5. The turbocharger of claim 1, and further comprising: the boost pump is an extra compression cylinder within the internal combustion engine.

6. The turbocharger of claim 1, and further comprising: the vibration damper is a wire mesh damper.

7. The turbocharger of claim 1, and further comprising: the vibration damper comprises a plurality of elements that are enclosed within a cavity formed between the journal bearing and the bearing housing.

8. The turbocharger of claim 7, and further comprising: the plurality of elements are ceramic balls.

9. The turbocharger of claim 7, and further comprising: the plurality of elements are metallic balls.

10. The turbocharger of claim 6, and further comprising: the wire mesh damper is a doughnut shaped damper.

11. The turbocharger of claim 6, and further comprising: the dampers are multiple segmented dampers arranged circumferentially around the bearing journal.

12. The turbocharger of claim 6, and further comprising: the wire mesh damper is cooled using cooling air that is also used to cool the hydrostatic bearing.

13. The turbocharger of claim 1, and further comprising: the compressed air used for the hydrostatic bearing is also used to cool a hub side of the turbine rotor.

* * * * *